US010722815B2

(12) United States Patent
MaHannah et al.

(10) Patent No.: US 10,722,815 B2
(45) Date of Patent: Jul. 28, 2020

(54) SYSTEM AND METHOD FOR EXTRACTION OF CANNABIS OIL FROM CANNABIS PLANT MATERIALS

(71) Applicant: EcoGreen Industries LLC, Anderson, CA (US)

(72) Inventors: Sean MaHannah, Redding, CA (US); Carl Kirkconnell, Huntington Beach, CA (US)

(73) Assignee: ECOGREEN INDUSTRIES LLC, Anderson, CA (US)

( * ) Notice: Subject to any disclaimer, the term of this patent is extended or adjusted under 35 U.S.C. 154(b) by 0 days.

(21) Appl. No.: 16/183,608

(22) Filed: Nov. 7, 2018

(65) Prior Publication Data

US 2019/0134531 A1 May 9, 2019

Related U.S. Application Data

(60) Provisional application No. 62/583,363, filed on Nov. 8, 2017.

(51) Int. Cl.
*B01D 11/02* (2006.01)
*C11B 1/10* (2006.01)
*F25B 9/14* (2006.01)

(52) U.S. Cl.
CPC ........ *B01D 11/028* (2013.01); *B01D 11/0207* (2013.01); *B01D 11/0215* (2013.01); *B01D 11/0292* (2013.01); *C11B 1/10* (2013.01); *C11B 1/102* (2013.01); *F25B 9/14* (2013.01); *F25B 2400/073* (2013.01)

(58) Field of Classification Search
CPC .............. B01D 11/028; B01D 11/0207; B01D 11/0215; B01D 11/0292; F25B 2400/073; F25B 9/14
See application file for complete search history.

(56) References Cited

U.S. PATENT DOCUMENTS 9,987,567 B1 * 6/2018 Ko .......................... B01D 3/085
2015/0125360 A1 * 5/2015 Wasserman ........ B01D 11/0219 422/280
2017/0266584 A1 * 9/2017 Steele ....................... C11B 1/10

* cited by examiner

*Primary Examiner* — Yate' K Cutliff
(74) *Attorney, Agent, or Firm* — Cislo & Thomas, LLP

(57) ABSTRACT

A system and method for extraction of *cannabis* oil from *cannabis* plant materials by further reducing the temperature of the extraction system effluent, which may be a mixture of solvent, the desired cannabinoids, and/or the undesired non-polar extracted waste from the plant material. This invention improves the extraction process by: 1) enhancing the rapid filtering of the waste material from the process stream, speeding up the overall process, and 2) improving the quality of the product, yielding a purer extract as evidenced, in part, by its lighter (yellow/gold) color as compared to less-pure green/brown extracts.

9 Claims, 2 Drawing Sheets

106
Valve #2
Valve #5
115
COLUMN
109
Multiple columns connected in parallel
100
104
Solvent
Cooling Jacket
103
112
out
in
107
Valve #3
110
Vent
Filter
Valve #6
Valve #1
101
108
Valve #4
114
GLYCOL Chiller (or equivalent)
105
Pump
out
in
113
Molecular sieve
Collection Pot
111
102
Vacuum
Oil
Bath Heater

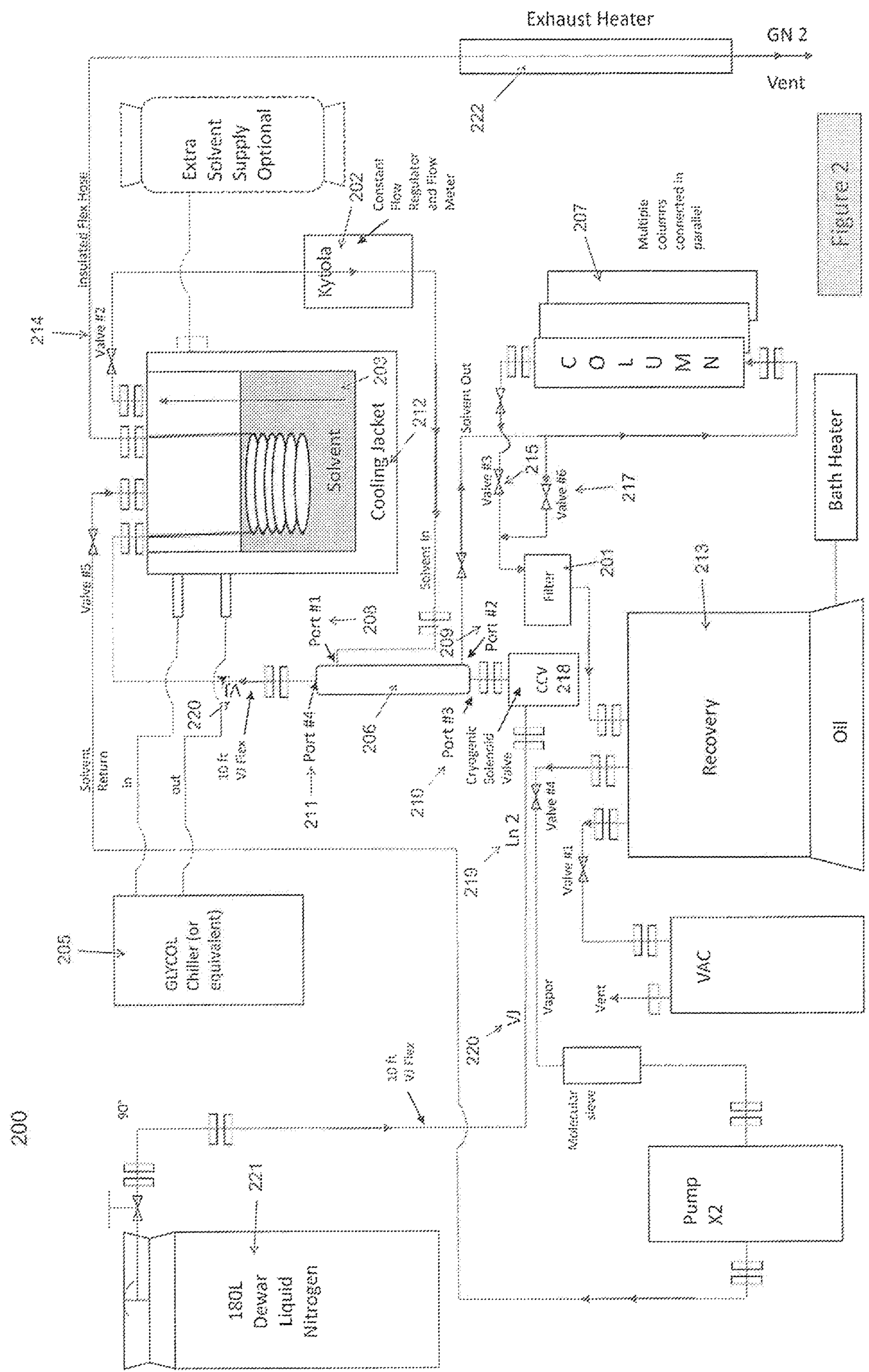
Exhaust Heater
GN 2
Vent
222
Extra Solvent Supply Optional
Figure 2
Insulated Flex Hose
202
Constant Flow Regulator and Flow Meter
Kyjola
207
Multiple columns connected in parallel
214
Valve #2
203
Solvent
Cooling Jacket
212
Solvent Out
C O L U M N
Valve #3
215
Valve #6
217
Bath Heater
Valve #5
Solvent In
Filter
201
213
Port #1
208
209
Port #2
CCV 218
220
10 ft VJ Flex
Port #4
206
Port #3
Cryogenic Solenoid Valve
Recovery
Oil
Solvent Return
In
Out
211
210
Valve #4
Ln 2
219
Valve #1
205
GLYCOL Chiller (or equivalent)
VAC
Vent
Vapor
VJ
220
10 ft VJ Flex
Molecular sieve
200
90°
221
Pump X2
180L Dewar Liquid Nitrogen

SYSTEM AND METHOD FOR EXTRACTION OF CANNABIS OIL FROM CANNABIS PLANT MATERIALS

CROSS-REFERENCE TO RELATED APPLICATION

This patent application claims the benefit of U.S. Provisional Patent Application Ser. No. 62/583,363, entitled "Improved System and Method for Extraction of *Cannabis* Oil from *Cannabis* Plant Materials," filed Nov. 8, 2017, which is incorporated in its entirety here by this reference.

TECHNICAL FIELD

This invention described herein generally relates to a system and method for improved extraction of *cannabis* oil from *cannabis* plant materials.

BACKGROUND

Use of both non-polar solvents, like butane and propane, and polar solvents, like ethanol, to extract active cannabinoids and terpenes from raw *cannabis* plant material is well known to practitioners of the art of *cannabis* oil extraction. Extraction solvents also separate out undesirable non-polar byproducts such as waxes, fats, and lipids from the plant material during extraction. These byproducts must be removed from the product stream, which is typically done with a cooling process to coagulate the waxes to make them amenable to straightforward filtering techniques. This filtering can be done in-line with a closed-loop process with solvent entering an extraction column on one end and exiting and passing through the filter stack at the other, through refrigerated post-processing of the extracted mixture, or a combination of these techniques.

Cooling is also used for "Live Resin" extraction, which requires sustained cold temperatures because the plant material must remain frozen since it is fresh rather than dried and cured. The water content inside the plant material is frozen for the duration of the extraction, otherwise the water (which is a polar solvent) will ruin the extract by pulling out unwanted plant constituents, such as green chlorophyll.

Current state of the art is limited to minimum coagulation temperatures bounded by the practical range of readily available, cost-effective cooling options such as "dry ice" (frozen CO2) or recirculating chillers using glycol or water-glycol mixtures. With consideration for equipment cost, logistics, electric power, etc., −30° F. to 10° F. has proven to be a typical operating range.

SUMMARY

The present invention is directed to the extraction of *cannabis* oil from *cannabis* plant materials by further reducing the temperature of the extraction system effluent, which may be a mixture of solvent, the desired cannabinoids, and/or the undesired non-polar extracted waste from the plant material. This invention improves the extraction process by: 1) enhancing the rapid filtering of the waste material from the process stream, speeding up the overall process, and 2) improving the quality of the product, yielding a purer extract as evidenced, in part, by its lighter (yellow/gold) color as compared to less-pure green/brown extracts. Substantial reduction in the available minimum refrigeration temperature may be made possible through the use of liquid nitrogen as the refrigerant. The boiling point of nitrogen is −320.4° F., so using nitrogen enables substantial lowering of the available minimum temperature range, given the proper engineering implementation, which is the subject of the present invention.

The subject invention may include: (1) the incorporation of additional refrigeration equipment into the existing closed-cycle solvent extraction systems, and (2) the modification of existing solvent extraction processes, including critical process durations and sequence, in order to make maximally effective use of the liquid nitrogen refrigerant. These improvements are best shown by comparison between existing art and the subject invention.

BRIEF DESCRIPTION OF DRAWINGS

FIG. 2 shows a flowchart of an extraction system with the incorporation of a cryogenic subsystem.

DETAILED DESCRIPTION OF THE INVENTION

Figure 1:
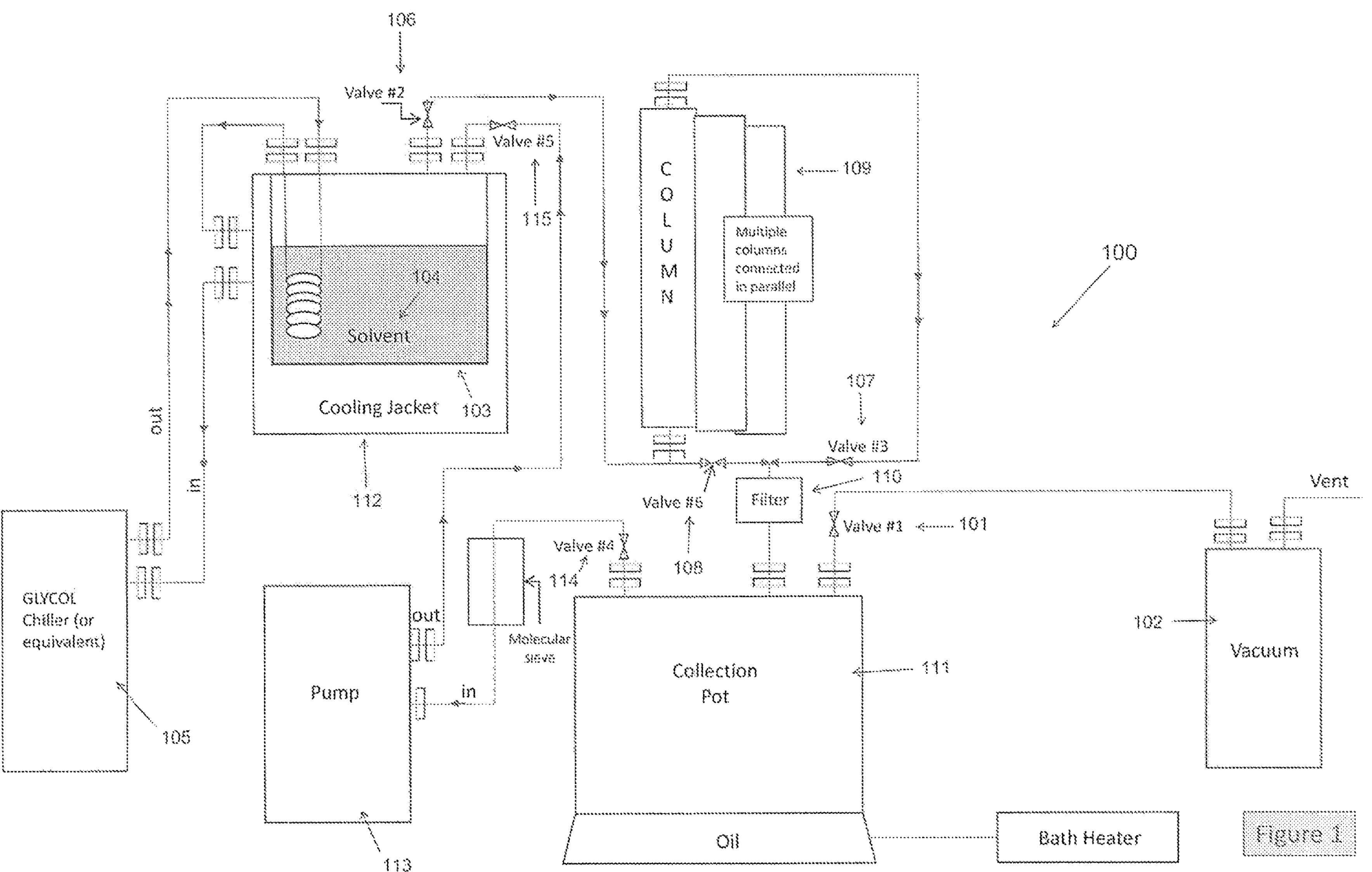
FIG. 1 shows a flowchart of a non-polar solvent closed loop extraction system.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

FIG. 1 depicts a non-polar solvent closed loop extraction system. The process generally initiates with the vacuum pumping of the solvent flow lines to remove volatile contaminants, including air. Valve #1 101 is opened, the system 100 is pumped down to approximately 1.E-3 Torr (absolute pressure) or lower vacuum 102, and Valve #1 101 is closed, and remains closed for the duration of the extraction process. The solvent in the Solvent Tank 103 is cooled to approximately 10° F. using a water-glycol chiller 105 (ex. Across International C30 Recirculating Chiller). Valves #2 106 and #3 107 are opened (and Valve #6 108 closed) to allow solvent to flow through one or more Extraction Columns 109, through a Filter 110, and into the Collection Pot 111. In the case of multiple Columns 109, they are arranged parallel in regards to the fluidic design. The Extraction Column(s) 109 is(are) typically cooled using a glycol chiller 105 by flowing the coolant through either a jacket 112 or cooling loop around the Column(s) 109. The Column 109 is typically filled rapidly at an essentially uncontrolled flow rate. The plant material in the Column 109 is allowed to soak in the chilled solvent for a period of time, typically on the order of tens of minutes, and then Valve #2 106 may be closed and Valve #6 108, termed the "Dump Valve," may be opened to flush the remaining contents of the Column(s) 109 through the Filter 110 and into the Collection Pot 111. This fill-purge process must typically be repeated several times to extract a satisfactory percentage of the cannabinoid oils available in the plant material. Waxes and other waste products are collected in the filter 110. The solvent, containing the desired cannabinoid oils, passes into the Collection Pot 111. Heat is used in the Collection Pot 111 to separate the solvent from the cannabinoid oils by vaporizing the liquid solvent. A vapor recovery pump 113 is then used to recover the solvent and return it back to the Solvent Tank 104. Valves #4 114 and #5 115 are opened for this purpose. The desired cannabinoid oil end product is removed and recovered by the user from the Collection Pot 111 following the completion of the solvent recovery process.

The Valves #1 101 thru #6 108 can be manual, pneumatically actuated, or electronically actuated. This is also the case for all of the Valves in the subject invention, described below and in FIG. 2.

FIG. 2 shows the same basic system as FIG. 1 but with the incorporation of the subject invention Cryogenic Subsystem. Starting from the same initial state, the solvent lines are again evacuated and the process solvent stored in the Solvent Tank 203. In the preferred implementation, the Solvent Tank 203 is pre-cooled by a water-glycol chiller 205, and the Solvent Tank 203 is also cooled by the Nitrogen Exhaust (new), which is discussed further below. Instead of flowing directly from the Solvent Tank 203 into the Extraction Column 207, the solvent flows through a user-settable Flow Regulator 202 (ex. Kytola 2851N Constant Flow Regulator) and through a Heat Exchanger 206 prior to entering the Extraction Column(s) 207. The solvent enters the Heat Exchanger 206 at Port #1 208 and exits at Port #2 209. The solvent entering Port #1 208 is cooled within the Heat Exchanger 206 by a counterflow of liquid nitrogen, which enters at Port #3 210 and exits at Port #4 211. (The solvent and the nitrogen flow streams do not mix within the Heat Exchanger, i.e., a two-sided heat exchanger.) The refrigerated solvent then flows through the Extraction Column(s) 207, through the Filter Stack 201, and into the Collection Pot 213. The Column(s) 207 is(are) thermally insulated from the environment, as can be effectively done with a vacuum jacket, to minimize heat leak from the environment into the Column(s) 207 so as to maintain the plant material-solvent mixture at low temperature After a period of approximately 30 minutes, the exact value of which is based on both the solvent and nitrogen flow rates, the solvent flow is terminated by shutting Valve #2 214, Valve #3 215 is closed, and Valve #6 217 is opened to flush the remaining Column 207 contents through the Filter Stack 201 and into the Collection Pot 213. In the preferred implementation, pressurized solvent vapor is applied at the top of the Column 207 during this "dump" step to provide positive pressure to assist the gravity force in pushing the Column 207 contents into the Collection Pot 213.

In the preferred implementation, the Heat Exchanger 206 is a counterflow shell-and-tube heat exchanger oriented with the cold end down, which is the end where the liquid nitrogen enters the shell (cold) side of the heat exchanger 206. Orienting the Heat Exchanger 206 cold end down maximizes efficiency and temperature stability be retaining the denser, colder liquid nitrogen at the cold end of the heat exchanger 206 by gravity. To minimize the Heat Exchanger 206 size, the preferred implementation is a very compact, high effectiveness design, such as one using microtubes with flow passages on the order of approximately 0.020" to 0.050" diameter for the tube side of the heat exchanger.

In the preferred implementation, the Flow Regulator 202 is settable to achieve the user's desired flow rate of solvent 204, which can vary between specific implementations based upon the number of parallel Columns 207, the size of the Columns 207, the density of plant material packed into the Columns 207, the exact solvent being used, other factors, and the preferences of the user. Typical solvent flow rate ranges from about 8 gallons/hour (GPH) for a single Column 207 system to 32 GPH for a four Column 207 system. In all cases, the Flow Regulator 202 serves the critical control function of preventing the solvent flow rate from exceeding the refrigeration capacity of the liquid nitrogen flow stream, which would result in warmer solvent temperatures than desired (i.e., >−73.3° C.; see below) exiting the Heat Exchanger 206 and entering the Column 207. The peak nitrogen flow rate and thus refrigeration capacity is limited by the orifice size of the Cryogenic Control Valve 218 (CCV; ex. Asco 8262 or 8263, Valcor SV91), as described below, so the Flow Regulator 202 is necessary to limit the solvent flow rate to maintain the system within the desired temperature control range. The Flow Regulator 202 is preferred to a valve or passive flow control orifice because the Regulator 202 can hold the flow rate "constant" even while the upstream Solvent Tank 203 pressure fluctuates, which is generally what happens as the thermodynamics within the Solvent Tank 203 are highly transient during the extraction cycle. Holding the solvent flow rate constant makes it possible to maintain a steady temperature for the solvent exiting the heat exchanger 206 with coarse (i.e., bang-bang solenoid) or even no closed-loop control of the nitrogen flow rate, which reduces cost and complexity of the system. Maintaining a steady temperature of the solvent yields a more controlled, more predictable extraction process, and thus a higher purity product.

In the preferred implementation, the LN2 Subsystem 219, which supplies a controlled flow rate of liquid nitrogen coolant to the Heat Exchanger 206, consists fundamentally of a liquid nitrogen Dewar 221, a vacuum-jacketed (VJ) fluid transfer line 220 to carry the liquid nitrogen from the Dewar to the CCV, a CCV which is a controllable solenoid valve rated for cryogenic operation, and a VJ exhaust line 220 to carry the nitrogen exiting the Heat Exchanger 206 to the Solvent Tank 203.

The LN2 Subsystem 219 is sized to provide the required cooling rate to achieve an exit temperature of solvent from the heat exchanger 206 at or around the target −100° F. (−73.3° C.), which based upon the inventor's experience is the preferred temperature; cooling below this temperature has not to date provided improved product quality, while substantially warmer temperatures (say, >−50° C.) have been shown to result in poorer product quality than is achievable at the target temperature. The required cooling to be provided by the nitrogen is therefore given by the product of the mass flow rate of solvent times the difference between the inlet enthalpy and the exit enthalpy. The available cooling from the nitrogen is, in turn, equal to the mass flow rate of nitrogen times the difference between the enthalpy of the exiting and entering flow streams. The Heat Exchanger 206 is, by design, nearly ideal (effectiveness>0.95), so to first order it can be assumed that the heat transfer rate from the solvent stream (cooling) is equal to the heat transfer rate into the nitrogen (warming). Increasing the solvent flow rate increases the required flow rate of nitrogen to achieve a given solvent exit temperature, which in turn increases the size and cost of all of the components within the LN2 Subsystem 219 and the Heat Exchanger 206. The incorporation of a Flow Regulator 202 on the Solvent Subsystem is thus a preferred means to ensuring a not-to-exceed solvent flow rate, which in turn enables design closure of a practical, i.e., affordable and compact, LN2 Subsystem 219. (As noted previously, other methods of restricting the solvent flow rate, such as a fixed orifice or manual valve, do exist.)

In the preferred implementation, the CCV 218 is actuated by an appropriately designed temperature controller that controls the opening of the valve, and hence the flow rate of the nitrogen, based upon the measured temperature of the solvent entering the extraction column 207, or at some other process temperature sufficiently representative of the temperature at which the extraction process is occurring. This helps prevent wasting liquid nitrogen, which is a finite and costly resource, by avoiding overcooling the solvent to below a temperature where there is no additional benefit in going colder, say to below −100° F. In one implementation, the CCV 218 is an on-off solenoid valve actuated by a temperature controller through a solid state relay. In another implementation, the CCV 218 is an I-P (current-pressure) valve, which provides more precise temperature control but at increased cost. In a viable low cost implementation, a manually-settable globe, needle, or ball valve, can be used. This approach is not generally preferred because it requires more careful monitoring of the system and frequent valve adjustment by the user to ensure the target temperature is being reached while avoiding over-discharging the limited nitrogen resource. A very similar implementation with essentially the same benefits and limitations as the manual valve is a solenoid valve with a user-settable duty cycle that does not update based on temperatures.

In an alternate embodiment, the subject Cryogenic System is used in conjunction with a polar solvent extraction. Ethanol is commonly used as a solvent in this alternate embodiment. The subject Cryogenic System is similarly employed to pre-cool the ethanol (or other polar solvent) using the same basic control components, namely a CCV 218, counterflow heat exchanger 206, all arranged and controlled to achieve a target temperature in the −50° C. range. (Slightly warmer but still very cold, temperatures are desirable for ethanol given the higher normal freezing temperature (−114.1° C.) as compared to the traditional n-butane (−138.3° C.) and propane (−187.7° C.) non-polar solvents.)

In yet another variation utilizing ethanol or another polar solvent, the counterflow heat exchanger 206 is located after the extraction system and before the collection system. The Cryogenic System is performing the identical process function as in the prior embodiments, just at a different point in the main *cannabis* oil extraction process.

Liquid nitrogen stored in a commercial cryogenic Dewar 221 is the preferred refrigerant because it is readily available, affordable relative to other common cryogenic refrigerants such as liquid helium, non-flammable, and non-toxic; it can be safely used following simple cryogenic fluid handling procedures, such as wearing cryogenically-rated gloves when handling the storage Dewar 221. Furthermore, with the melting temperature being well below the objective solvent refrigeration temperature, the benefit of the "latent heat of vaporization" is realized. The enthalpy flux required to boil the inlet liquid nitrogen to gaseous nitrogen is heat removed from the solvent stream, and this occurs along the constant temperature saturation line of the nitrogen, which at the typical Dewar supply pressure of 25 psig is ~−303° F. Even after the nitrogen inlet has boiled to a gas, there is still appreciable cooling capacity remaining relative to the target −100° F. solvent outlet temperature. This large temperature difference between the cryogenic refrigerant and the objective solvent temperature simplifies the design of the Heat Exchanger 206 and reduces the risk of not meeting the target solvent temperature.

Because the liquid nitrogen can generally enter the counterflow heat exchanger 206 at a temperature below the normal freezing temperature of the solvent, freezing of the solvent is possible. Freezing is undesirable because it causes the solvent flow rate to be reduced and possibly even ceased, inhibiting or in the worst case stopping the extraction process. The process sequence and controls are therefore implemented so that the cooling rate in the heat exchanger 206 due to the LN2 219 flow is adequate to achieve the target cooling, but never so excessive as to result in freezing. In the preferred embodiment this is accomplished by monitoring the temperature of the solvent exiting the heat exchanger 206 and implementing a sufficiently fast feedback loop so that the CCV 218 does not "flood" the heat exchanger 206 between readings, which could exceed the thermal capacitance of the solvent flow to stay in liquid form if allowed to occur. This is accomplished through a combination of proper heat exchanger 206 sizing, CCV 218 peak flow rate limiting, adequately high speed of the control loop, and adequate volume in the plumbing system for the LN2 219 between the CCV 218 and the heat exchanger 206 (to limit the peak LN2 219 flow rate entering the heat exchanger when the valve opens).

With the inlet temperature of the solvent generally being well below room ambient temperature given the chilling of the Solvent Tank, the nitrogen exhaust will typically exit the Heat Exchanger 206 still well below room ambient temperature. Exit temperatures between −30° F. and 10° F. are typical. In the preferred implementation and to avoid wasting the remaining refrigeration availability of the nitrogen exhaust flow stream, the nitrogen exhaust is routed to the Solvent Tank 203 to pre-cool the solvent before it has even entered the Flow Regulator 202. This is ideally done with an insulated (i.e., VJ) cryogenic transfer line to minimize heat transfer from the environment to the nitrogen exhaust flow stream to maintain the refrigeration availability of the exhaust stream. The nitrogen exhaust, which would typically be passed through either a cooling jacket or cooling coil in the Solvent Tank, cools the solvent, and then exits the Solvent Tank 203 and is vented to the environment at nominally room temperature. (Industry-standard safe nitrogen venting practices must be observed at the exit to avoid oxygen depletion in the working facility. A heater 222 may be used at the exit to avoid freezing and/or condensation.)

In this preferred implementation with the nitrogen exhaust pre-cooling the Solvent Tank 203, an additional and important benefit is realized. By cooling the Solvent Tank 203, the pressure within the Solvent Tank 203 is reduced. This provides an obvious safety benefit, and it also provides an operational benefit because reducing the back pressure in the Solvent Tank 203 speeds up the vapor recovery process (from the Collection Pot 213 to the Solvent Tank 203). For this reason, in the preferred implementation the LN2 219 flow rate from the Dewar 221 continues even after the Solvent flow stream (i.e., Column 207 filling) has been completed to maintain low pressure in the Solvent Tank 203 during the Flush and Recovery processes.

Protocol and Data:

A particular implementation for a 2-Column Extraction was constructed and operated as described below. For this particular test, the solvent is propane.

Preparation.

Extraction columns, filters, collection pot, and all connecting solvent lines evacuated to less than 1.0E-3 Torr using a vacuum pump. Vacuum pump valve closed.

While the solvent side was being evacuated, the liquid nitrogen flow was initiated at approximately 67% of the operational flow rate to pre-cool the counterflow heat exchanger to −180° C. and help pre-cool the solvent tank.

Glycol chiller turned on to assist in pre-cooling the solvent tank.

Solvent tank pre-cooled to approximately −3° C. at 50 psig through the combination of the chiller and the cold nitrogen exhaust.

Solvent Flow Initiation and Column Fill

The valve on the solvent tank was opened to initiate solvent flow through the heat exchanger and into the columns.

The solvent flow rate was set to 15 GPH.

The nitrogen flow rate was set to approximately 225 standard liters per minute (SLPM) by programming the duty cycle of the cryogenic solenoid valve at 75%. This was accomplished using a Watlow controller connected to the solenoid valve across an A/C solid state relay.

At these flow rates, the solvent temperature was measured at a nearly ideal −80° C. at the entrance of the columns. Closed-loop temperature control was not required and thus not used for this experiment.

Liquid solvent was first observed through the sight glass at the columns exit 15 minutes after the initiation of the flow.

Solvent flow was continued for another 25 minutes, and then terminated by closing the solvent tank valve.

Solvent Flush

During the column dump run, the nitrogen flow rate was greatly reduced to about 30 SLPM by reducing the solenoid duty cycle to 10%. This preserves LN2 while helping to maintain cool temperature and thus low back pressure in the solvent tank.

A valve between the heat exchanger and the column was closed to prevent back-flushing of solvent containing resin and other extracts from entering the heat exchanger during this process, which could otherwise foul the heat exchanger.

The remaining contents of the columns were then flushed through the filter stack and emptied into the collection pot. Positive pressure of gaseous propane is applied at the top of the columns to assist in pushing all of the resin containing solvent from the columns and into the collection pot.

<End of Process>

Other Benefits:

Colder dewaxing extraction temperatures than any currently known approach, which accelerates and makes more complete the removal of unwanted waxes from the process stream and yields an ultimately more pure resin;

Facilitates "Live Resin" extractions by maintaining the undried plant material in a frozen state, which effectively locks-up the water content in the material and prevents the water from behaving as an additional unwanted polar solvent.

Convenience of not having to deal with the many drawbacks of having to create messy dry ice cooling baths on a daily basis;

The subject invention is capable of performing continuous duty without interruption or need for a waiting period between extraction runs, which increases productivity by reducing wasted time between extraction runs.

Current glycol recirculating chillers have difficulty maintaining their temperature set points during an extraction and usually require a long cool down period between extractions to get back to the setpoint because of both their refrigeration capacity and the fact that their minimum temperature is essentially equivalent to the desired process temperature. The LN2 in the subject invention is much colder than the required process temperature, which increases the heat transfer rate and reduces the cool down time.

Maintaining cold temperatures in a Solvent Tank with the nitrogen exhaust is new and beneficial to control Solvent Tank pressure, which is a necessary safety precaution as well as a useful tool to speed-up the overall solvent recovery time by reducing back pressure in the solvent storage tank and limiting the wear and tear on the recovery pump.

The foregoing description of presently preferred embodiments of the invention has been presented for the purposes of illustration and description only. It is not intended to be exhaustive or to limit the invention to the precise form(s) disclosed. Many modifications and variations are possible in light of the above teachings while remaining consistent with the spirit of the invention. It is intended that the scope of the invention not be limited by this detailed description.

What is claimed is:

1. A system for extraction of *cannabis* oil from *cannabis* plant materials, the system comprising:

a. a solvent tank containing a solvent;

b. a water-glycol chiller configured to cool the solvent tank;

c. a dewar, located upstream of the solvent tank and upstream of a cryogenic control valve, wherein the dewar is configured to store liquid nitrogen;

d. a flow regulator, located downstream of the solvent tank, wherein the flow regulator is configured to regulate the flow of the solvent through the system;

e. a heat exchanger, located both downstream and upstream of the solvent tank, wherein the heat exchanger is configured to cool the solvent;

f. an extraction column, located downstream of the heat exchanger, wherein the extraction column contain *cannabis* plant materials comprising *cannabis* oils and is configured such that;

g. when the cooled solvent flows through the extraction column and through the *cannabis* plant materials, the cooled solvent attaches to the *cannabis* oils and a fraction of the waste products;

h. a filter stack, located downstream of the extraction columns, wherein the filter stack is configured to filter out the cooled solvent containing *cannabis* oils from the fraction of waste products;

i. a collection pot, located downstream of the filter stack, wherein the collection pot is configured to collect the cooled solvent containing *cannabis* oils;

j. wherein the collection pot uses heat to separate the cooled solvent from the *cannabis* oils by vaporizing the cooled solvent.

2. The system as in claim 1, wherein the system is configured to transport the liquid nitrogen from the dewar to the cryogenic control valve through a vacuum jacketed fluid transfer line.

3. The system as in claim 2, wherein the heat exchanger is configured to cool the solvent with a counterflow of liquid nitrogen without mixing the solvent and the liquid nitrogen.

4. The system as in claim 3, wherein the heat exchanger has a first end and a second end opposite the first end to allow the flow of the solvent through the first end and the flow of the liquid nitrogen to enter the heat exchanger through the second end.

5. The system as in claim 4, wherein the heat exchanger is configured to have the first end oriented on a bottom end of the heat exchanger.

6. The system as in claim 5, wherein the heat exchanger is configured to use microtubes with flow passages of less than 0.050 inch in diameter.

7. The system as in claim 6, wherein the cryogenic control valve is configured to actuate based upon a temperature of the solvent when entering the heat exchanger.

8. The system as in claim 7, further comprising a plurality of extraction columns, wherein the plurality of extraction columns are configured to be parallel to each other.

9. The system as in claim 8, wherein the flow regulator is configured to regulate the flow of the solvent depending on the number of columns in the plurality of columns that are used in the system.

* * * * *